(12) United States Patent
van Rooyen et al.

(10) Patent No.: US 11,845,132 B2
(45) Date of Patent: Dec. 19, 2023

(54) METHODS OF FORMING COMPONENTS OF HEAT EXCHANGERS AND METHODS OF FORMING HEAT EXCHANGERS

(71) Applicant: Battelle Energy Alliance, LLC, Idaho Falls, ID (US)

(72) Inventors: Isabella J. van Rooyen, Idaho Falls, ID (US); Piyush Sabharwall, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 17/806,916

(22) Filed: Jun. 14, 2022

(65) Prior Publication Data

US 2022/0324024 A1    Oct. 13, 2022

Related U.S. Application Data

(62) Division of application No. 16/565,168, filed on Sep. 9, 2019, now Pat. No. 11,383,302.

(Continued)

(51) Int. Cl.
*F28F 21/08* (2006.01)
*B22F 10/22* (2021.01)
(Continued)

(52) U.S. Cl.
CPC .............. *B22F 5/10* (2013.01); *B22F 10/22* (2021.01); *B22F 10/25* (2021.01); *B22F 10/28* (2021.01);
(Continued)

(58) Field of Classification Search
CPC .......... B22F 10/20; B22F 10/22; B22F 12/53; B22F 10/25; B22F 10/28; B22F 10/43;
(Continued)

(56) References Cited

U.S. PATENT DOCUMENTS 4,285,779 A    8/1981 Shiga et al.
5,317,805 A *  6/1994 Hoopman ............... F28F 21/08
                                                  257/E23.098

(Continued)

OTHER PUBLICATIONS

Ashman et al., A Review of Manufacturing Processes for Microchannel Heat Exchanger Fabrication, Proceedings of ICNMM2006, Fourth International Conference on Nanochannels, Microchannels and Minichannels, Jun. 19-21, 2006, Limerick, Ireland, 6 pages.*

(Continued)

*Primary Examiner* — Lawrence Averick
(74) *Attorney, Agent, or Firm* — TraskBritt

(57) ABSTRACT

A method of forming at least a component of a heat exchanger comprises introducing a feed material comprising a first portion including a matrix material and a second portion including a sacrificial material on a surface of a substrate, exposing at least the first portion to energy to form bonds between particles of the matrix material and form a first thickness of a structure, introducing additional feed material comprising the first portion over the first thickness of the structure, exposing the additional feed material to energy to form a second thickness of the structure, and removing the sacrificial material from the structure to form at least one channel in the structure. Related heat exchangers and components, and related methods are disclosed.

20 Claims, 8 Drawing Sheets

Related U.S. Application Data

(60) Provisional application No. 62/734,455, filed on Sep. 21, 2018.

(51) Int. Cl.

| | | |
|---|---|---|
| *B22F 5/10* | (2006.01) | |
| *B33Y 10/00* | (2015.01) | |
| *B28B 1/00* | (2006.01) | |
| *B23P 15/26* | (2006.01) | |
| *F28F 21/04* | (2006.01) | |
| *B33Y 80/00* | (2015.01) | |
| *B33Y 70/10* | (2020.01) | |
| *B33Y 70/00* | (2020.01) | |
| *B22F 10/28* | (2021.01) | |
| *B22F 10/25* | (2021.01) | |
| *B22F 10/43* | (2021.01) | |
| *B22F 10/62* | (2021.01) | |
| *B22F 10/64* | (2021.01) | |
| *B22F 10/66* | (2021.01) | |
| *B22F 12/53* | (2021.01) | |

(52) U.S. Cl.
CPC .............. *B22F 10/43* (2021.01); *B22F 10/62* (2021.01); *B22F 10/64* (2021.01); *B22F 10/66* (2021.01); *B23P 15/26* (2013.01); *B28B 1/001* (2013.01); *B33Y 10/00* (2014.12); *B33Y 70/00* (2014.12); *B33Y 70/10* (2020.01); *B33Y 80/00* (2014.12); *F28F 21/04* (2013.01); *F28F 21/081* (2013.01); *B22F 12/53* (2021.01); *F28F 2255/18* (2013.01)

(58) Field of Classification Search
CPC .......... B22F 10/62; B22F 10/64; B22F 10/66; B22F 5/10; B23P 15/26; B28B 1/001; B33Y 10/00; B33Y 70/00; B33Y 70/10; B33Y 80/00; F28F 21/04; F28F 21/081; F28F 2255/18; F28F 7/02; Y02P 10/25; F28D 7/06; F28D 7/08

See application file for complete search history.

(56) References Cited

U.S. PATENT DOCUMENTS

| | | | |
|---|---|---|---|
| 5,354,414 A | 10/1994 | Feygin | |
| 5,637,175 A | 6/1997 | Feygin et al. | |
| 5,876,550 A | 3/1999 | Feygin et al. | |
| 6,113,722 A | 9/2000 | Hoffman et al. | |
| 6,572,742 B1 | 6/2003 | Cohen | |
| 6,861,205 B2 | 3/2005 | Bowman et al. | |
| 8,245,757 B2 * | 8/2012 | Crump | B33Y 40/00 106/286.7 |
| 10,614,923 B2 | 4/2020 | Van et al. | |
| 2003/0121791 A1 * | 7/2003 | Cohen | B81C 1/00619 205/135 |
| 2003/0148222 A1 | 8/2003 | Bowman et al. | |
| 2007/0264542 A1 * | 11/2007 | Devoe | H01M 8/1004 429/432 |
| 2010/0193998 A1 * | 8/2010 | Crump | B29C 64/40 106/286.6 |
| 2018/0025797 A1 | 1/2018 | Van et al. | |
| 2020/0338639 A1 * | 10/2020 | Friesth | G21C 1/00 |

OTHER PUBLICATIONS

Hoffer et al., "Modeling a Helical-coil Steam Generator in RELAP5-3D for the Next Generation Nuclear Plant", Idaho National Laboratory, INL/EXT-10-19621, (Jan. 2011), 67 pages.

Khan et al., "Thermal-hydraulic characteristics and performance of 3D wavy channel based printed circuit heat exchanger", Applied Thermal Engineering, 87 (2015) pp. 519-528.

Lewinsohn, "High-efficiency, ceramic microchannel heat exchangers", American Ceramic Society Bulleting, vol. 94, No. 5 (Jun. / Jul. 2015) pp. 26-31.

* cited by examiner

METHODS OF FORMING COMPONENTS OF HEAT EXCHANGERS AND METHODS OF FORMING HEAT EXCHANGERS

CROSS-REFERENCE TO RELATED APPLICATIONS

This application is a divisional of U.S. patent application Ser. No. 16/565,168, filed Sep. 9, 2019, now U.S. Pat. No. 11,383,302, issued Jul. 12, 2022, which claims the benefit under 35 U.S.C. § 119(e) of U.S. Provisional Patent Application Ser. No. 62/734,455, filed Sep. 21, 2018, the disclosure of each of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to methods of fabricating one or more components of a heat exchanger. More particularly, embodiments of the disclosure relate to methods and apparatuses for manufacturing one or more components of a heat exchanger by additive manufacturing, and to related methods.

BACKGROUND

Many industrial processes utilize heat exchangers to transfer heat between materials having different temperatures. For example, heat exchangers find utility in aerospace applications, nuclear applications, air conditioning, refining, power generation, chemical process plants, hybrid nuclear power applications, other energy applications, and other industrial processes.

A conventional heat exchanger includes a so-called hot side in which a thermal transfer material (e.g., a fluid, a liquid, or a gas) having a relatively higher temperature (e.g., a hot thermal transfer material) is located, and a so-called cold side in which a thermal transfer material having a relatively lower temperature than the hot thermal transfer material is located. At least one of the hot side or the cold side may be defined by one or more channels through which the respective hot thermal transfer material or cold thermal transfer material flows.

In general, the hot side of the heat exchanger is physically separated from the cold side of the heat exchanger by at least one medium to prevent mixing of the hot thermal transfer material with the cold thermal transfer material. As one example, a shell-and-tube heat exchanger includes tubes through which one of a hot thermal transfer material and a cold thermal transfer material passes and a shell-side through which the other of the hot thermal transfer material and the cold thermal transfer material passes. Heat is transferred from one thermal transfer material to the other through the tube walls.

Despite the longstanding use of heat exchangers in many industries, fabrication of heat exchangers remains an expensive and time consuming process. In some cases, the joining of different components of the heat exchanger requires welding, diffusion bonding (wherein two surfaces are bonded together under high temperature and high pressure), brazing of materials together, or other bonding process. Such methods of joining, particularly between dissimilar materials, are prone to failure. Failure of the joints may result in undesired leaks between the cold thermal transfer material and the hot thermal transfer material, or a loss of containment of one or both of the cold thermal transfer material and the hot thermal transfer material. In addition, many heat exchangers are subjected to harsh environments, including exposure to thermal transfer materials comprising one or more of a molten salt, water, steam, or materials exhibiting an excessive temperature pressure. Due to the harsh conditions to which they are exposed, such heat exchangers are prone to fail. Also, due to application of high pressure during diffusion bonding process, it is a challenge to maintain the same nominal diameter with precision throughout the channels and tubes. Unfortunately, even if the failure of the heat exchanger is localized, the failure may necessitate removal of the heat exchanger from operation and may result in downtime, with a resulting loss of production.

Fabrication of conventional heat exchangers may require separate formation of components of the heat exchanger (e.g., tubes, plates, baffles, tubesheets, etc.), machining of the components thereof, assembly and joining of the components thereof, and testing of the assembled product. However, machining and assembly of the heat exchanger is time consuming and presents difficulties, particularly for complex heat exchanger geometries.

BRIEF SUMMARY

Embodiments disclosed herein include methods of additively manufacturing heat exchangers and components thereof, and related structures, heat exchangers, and methods. For example, in accordance with one embodiment, a method of forming at least a component of a heat exchanger comprises introducing a feed material comprising a first portion including a matrix material and a second portion including a sacrificial material on a surface of a substrate, selectively exposing at least the first portion to focused energy to form bonds between particles of the matrix material and form a first thickness of a structure, introducing additional feed material comprising the first portion over the first thickness of the structure, selectively exposing the additional feed material to focused energy to form a second thickness of the structure, and removing the sacrificial material from the structure to form at least one channel in the structure.

In other embodiments, a method of forming a structure including at least one channel comprises disposing a first layer of a material on a substrate. Forming the first layer comprises disposing a matrix material on the substrate, disposing a sacrificial material on the substrate adjacent to the matrix material, and exposing at least the matrix material to energy comprising a laser beam or an electron beam to form bonds between adjacent particles of the matrix material. The method further comprises disposing a second layer of a material on the first layer, exposing the second layer of the material to the energy to form a structure, and removing the sacrificial material from the structure to form channels within the structure.

In yet other embodiments, a method of forming a heat exchanger comprises disposing a first layer of a feed material on a substrate. The first layer comprises a sacrificial material defining channel regions, and a matrix material exhibiting a varying composition with a distance from the channel regions. The method further comprises exposing the first layer to focused energy to form bonds between particles of at least the matrix material, disposing a second layer of the feed material on the first layer, and exposing the second layer to focused energy to form bonds between adjacent particles of the second layer.

DETAILED DESCRIPTION

Figure 1:
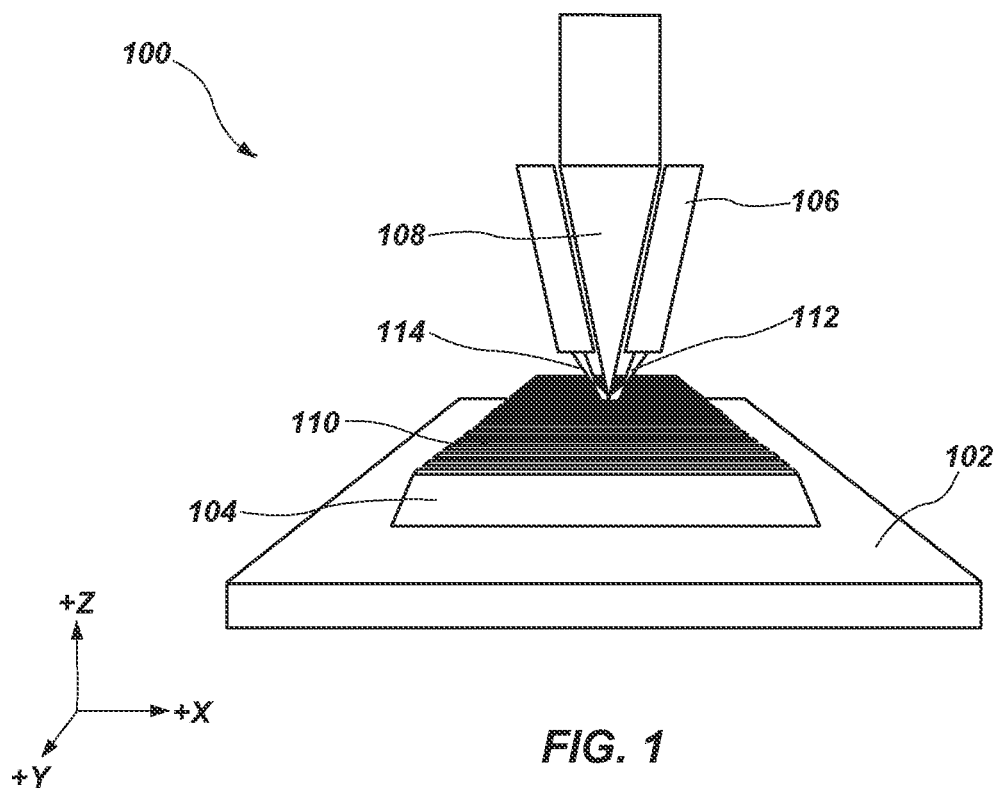
FIG. 1 is a simplified schematic of a system for additively manufacturing a structure, in accordance with embodiments of the disclosure.

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for forming a heat exchanger, a component of a heat exchanger, another structure, or related methods. Only those process acts and structures necessary to understand the embodiments of the disclosure are described in detail below. Additional acts to form a heat exchanger, a component of a heat exchanger, or another structure may be performed by conventional techniques. Further, any drawings accompanying the present application are for illustrative purposes only and, thus, are not drawn to scale. Additionally, elements common between figures may retain the same numerical designation.

According to embodiments described herein, a heat exchanger or one or more components thereof may be fabricated by additive manufacturing, such as by one or more of laser engineering net shaping (LENS), selective laser sintering (SLS), aerosol jet printing (AJP) (also referred to as aerosol ink additive manufacturing), plasma jet printing, powder bed additive manufacturing, wire arc additive manufacturing (WAAM), direct energy deposition, stereolithography (SLA), digital light projection (DLP) (also referred to as digital light processing), solgel additive manufacturing, another additive manufacturing method, or combinations thereof. In some embodiments, channels (i.e., regions through which one or both of a hot thermal transfer material and a cold thermal transfer material flow) of the heat exchanger are formed by additive manufacturing. The channels may be formed by, for example, forming a body of the heat exchanger by additive manufacturing, the body comprising a matrix material. During the additive manufacturing process, a sacrificial material may be formed or disposed at locations corresponding to the channels. The sacrificial material may comprise a material that may not form a bond (e.g., a metallurgical bond) with the matrix material. In other embodiments, the sacrificial material may comprise a relatively low melting point material that may be removed after formation of the matrix material. After forming the matrix material and the sacrificial material, the sacrificial material may be removed, such as physically removed, by melting a low melting point material to remove the sacrificial material from the channels, by chemical dissolution, by chemically reacting the sacrificial material, another method, or combinations thereof. Since the heat exchangers are formed by additive manufacturing, the channels may be formed to exhibit desired properties (e.g., surface roughness, regions promoting turbulence in the channel, etc.). In addition, the heat exchangers may be formed to exhibit a gradient in at least one property and in at least one direction. As another example, the heat exchangers may be formed to exhibit a gradient in composition, such as a gradient in at least one metal material and a gradient in at least one ceramic material in at least one direction. The heat exchangers may be formed using a variety of materials depending on a desired use of the heat exchangers. Since the heat exchangers are formed by additive manufacturing, the heat exchangers may be formed from a larger group of materials compared to conventional heat exchangers.

In some embodiments, the heat exchangers formed according to embodiments disclosed herein may not suffer from weaknesses at joints (e.g., bonding locations) between dissimilar materials (e.g., ceramics and metals), in contrast to conventionally formed heat exchangers. In some embodiments, internal residual stresses in the heat exchanger are removed and/or relieved during fabrication of the heat exchanger. Accordingly, the heat exchanger may be less likely to fail during use and operation. In addition, the methods disclosed herein may facilitate replacement of damaged components of a heat exchanger and may facilitate use of modular heat exchangers. A heat removal capacity (i.e., a duty capacity) of a system including a plurality of heat exchangers may be tailored based on a number of modular heat exchangers in the system.

FIG. 1 is a simplified schematic of a system 100 for additively manufacturing a structure 110, in accordance with embodiments of the disclosure. The system 100 may comprise, for example, a laser engineering net shaping system, a selective laser sintering system, or another system for additively manufacturing the structure 110. The system 100 comprises a table 102 configured to receive a substrate 104. The table 102 may be configured to move in the x-direction and the y-direction. In some embodiments, the table 102 is configured to move in the z-direction. The substrate 104 may comprise any suitable material on which the structure 110 may be formed by additive manufacturing.

The structure 110 may be formed over the substrate 104 by disposing a powder material on the substrate 104, and exposing the powder material to energy from an energy source 108. The energy source 108 may comprise, for example, a laser. The powder material may be provided to a surface 112 of the substrate 104 (or an upper exposed surface of the structure 110) via one or more powder delivery nozzles 106. In some embodiments, the system 100 includes more than one powder delivery nozzle 106, wherein at least one of the powder delivery nozzles 106 is configured to provide a powder having a different composition than the powder provided by at least another powder delivery nozzle 106. In some embodiments, powder from different powder delivery nozzles 106 may converge on the substrate 104 or the structure 110, as indicated at arrow 114.

Figure 2:
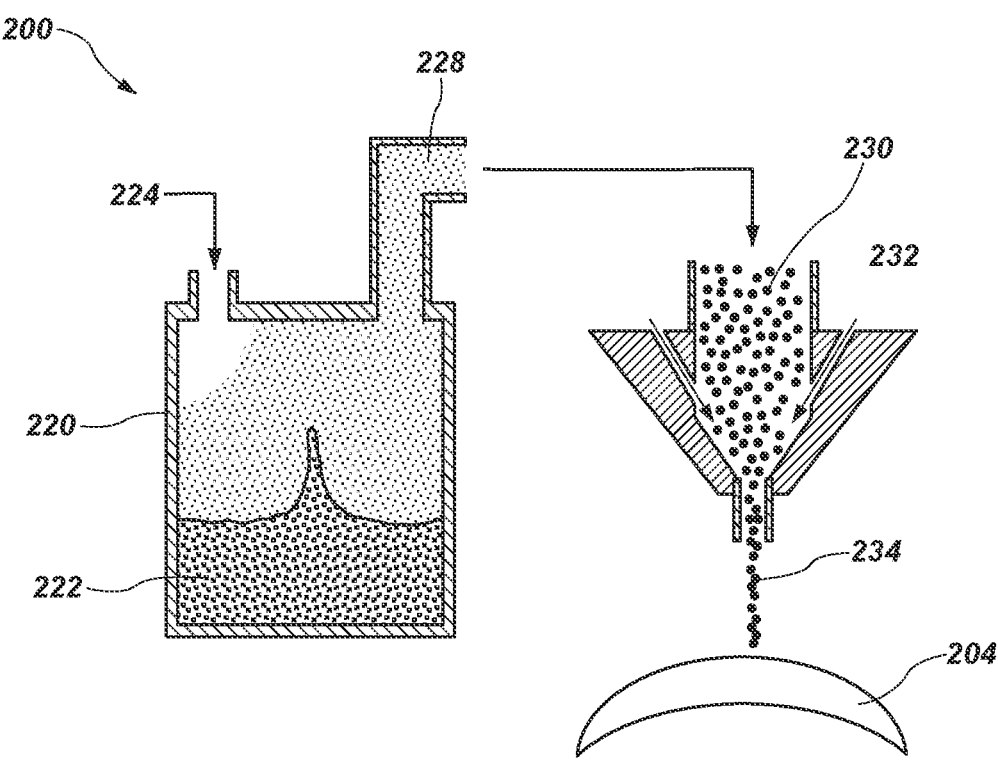
FIG. 2 is a simplified schematic of a system for additively manufacturing a structure, in accordance with other embodiments of the disclosure.

FIG. 2 is a simplified schematic of another system 200 for additively manufacturing a structure, in accordance with embodiments of the disclosure. The system 200 comprises a tank 220 including a feed material 222 therein. The tank 220 may include an inlet 224 through which a gas is introduced to atomize the feed material 222 and form an aerosol 226. The aerosol 226 may be provided to a delivery nozzle 230 (e.g., a deposition head) via an outlet 228 of the tank 220. A sheath gas may be mixed with the aerosol 226 as the aerosol 226 exits the delivery nozzle 230. The sheath gas may be provided via a sheath gas outlet 232, which may comprise a shroud around the outlet of the delivery nozzle 230. A beam 234 of the aerosol 226 may be provided to a surface of a substrate 204 or an upper surface of an article to form a thickness (e.g., a layer) of the structure.

After depositing the aerosol on the substrate 204 and forming a thickness of the structure, the delivery nozzle 230 may be moved relative to the substrate 204. The aerosol 226 may be delivered to the upper exposed surface of the structure to form another thickness of the structure. The process may be repeated until the structure is formed to have a desired size and shape.

The systems 100, 200 may be controlled by a processor having associated therewith a memory including instructions configured to direct the respective ones of the powder delivery nozzles 106 and the delivery nozzle 230 to locations where powder or the aerosol 226 from the respective powder delivery nozzle 106 or delivery nozzle 230 should be provided. By way of nonlimiting example, the memory may include data for formation of a desired structure in the form of a computer-aided-design (CAD) model or a computer-aided-manufacturing (CAM) model configured to direct the powder delivery nozzles 106 and the delivery nozzle 230.

Although FIG. 1 and FIG. 2 illustrate particular systems 100, 200 for additively manufacturing a structure, the disclosure is not limited to such systems 100, 200. In other embodiments, one or more structures may be additively manufactured with other systems, such as with a selective laser sintering (SLS) system, a powder bed additive manufacturing system, a wire arc additive manufacturing system, a plasma jet printing system, direct energy deposition, stereolithography, digital light projection, solgel additive manufacturing, another additive manufacturing method, or combinations thereof.

Figure 3A:
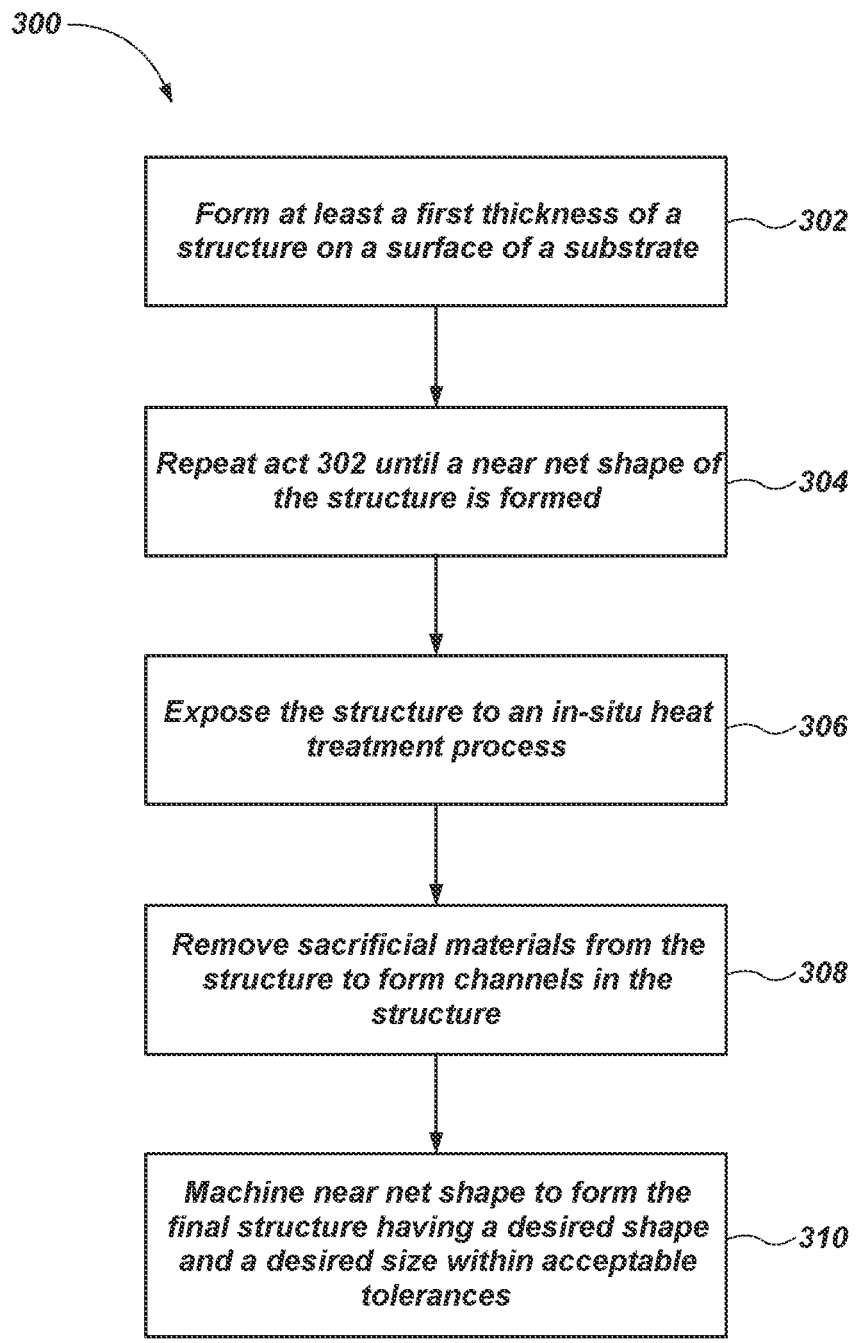
FIG. 3A is a simplified flow diagram of a method of additively manufacturing a structure, in accordance with embodiments of the disclosure.

FIG. 3A is a simplified flow diagram illustrating a method 300 of forming a structure by additive manufacturing, in accordance with embodiments of the disclosure. The structure may comprise a heat exchanger, or at least a component thereof. The method 300 may include forming the structure by one or more additive manufacturing processes, such as, for example, AJP, plasma jet printing, LENS, SLS, WAAM, powder bed additive manufacturing, another additive manufacturing method, or combinations thereof.

The method 300 includes act 302 including forming at least a first thickness of a structure on a surface of a substrate, act 304 including repeating act 302 until a near net shape of the structure is formed; act 306 including optionally exposing the structure to an in-situ heat treatment process; act 308 including removing sacrificial materials from the structure to form channels in the structure; and act 310 including minor machining of the near net shape to form the final structure having a desired shape and a desired size within acceptable tolerances.

Act 302 may include forming at least a first thickness of a structure on a surface of a substrate. Forming the first thickness of the structure may include forming a first thickness of a feed material on a surface of a substrate and exposing (e.g., selectively exposing) at least a portion of the first thickness of the feed material to energy (e.g., electromagnetic radiation from a laser, energy from an electron beam, a plasma beam) to form bonds (e.g., metallurgical bonds, such as by sintering) between adjacent particles of the feed material within the first thickness. In some embodiment, a portion of the first thickness of the feed material is not exposed to energy such that the unexposed portion of the feed material does not form bonds with adjacent particles of the feed material. In some such embodiments, only a portion of the first thickness of the feed material is selectively exposed to energy. As used herein, selectively exposing a material to energy means and includes exposing only a portion of the material (e.g., a particular pattern of the material) to the energy. The energy may include, for example, focused energy, such as a laser, an electron beam, heat through a nozzle, a plasma, or another form of focused energy (e.g., a beam).

In some embodiments, the feed material may include a sacrificial material and a matrix material. The sacrificial material may be formulated and configured such that it does not substantially remain in the final structure to be formed. However, the sacrificial material may be embedded within the matrix material until a predetermined time, such as when the structure has a size and shape of about a near net shape. As such, the sacrificial material may be referred to as an "embedded" material. The matrix material may remain in the final structure. As will be described herein, the sacrificial material comprises a placeholder (e.g., embedded material) defining channels (flow paths, voids, etc.) of the structure (such as channels of a heat exchanger) and may be removed after the matrix material is bonded (e.g., sintered) to form voids defined by locations corresponding to the sacrificial material.

In some embodiments, such as where the structure is formed by AJP, the feed material may include a resin material in which the matrix material, the sacrificial material, or both are dispersed. By way of nonlimiting example, the resin material may include high temperature polymers. By way of nonlimiting example, the resin material may comprise polyphenylene sulfide (PPS), polyetheretherketone (PEEK), polyetherketone (PEK), polyphthalamide (PPA), hot water moldable polyphthalamide (PPA), polyetherketoneketone (PEKK), polyimide (TPI), high temperature nylon (HTN), polysulfone (PSU), polyethersulfone (PES), polyetherimide (PEI), liquid crystal polymer (LCP), another material, and combinations thereof. In other embodiments, the feed material comprises a powder material, such as in LENS-based or SLS-based processes.

The matrix material may include a material formulated and configured to comprise at least a portion or a component of a heat exchanger. In some embodiments, the matrix material may include one or more of a metal material, a ceramic material, an ink material including one or more metals or ceramics, and combinations thereof. By way of nonlimiting example, the matrix material may include particles of one or more of stainless steel (e.g., 316 stainless steel (a stainless steel composition comprising between about 16.0 weight percent and about 18.0 weight percent chromium, between about 10.0 weight percent and about 14.0 weight percent nickel, between about 2.0 weight percent and about 3.0 weight percent molybdenum, and up to about 2.0 weight percent manganese, less than about 1.0 weight percent of each of carbon, silicon, phosphorus, sulfur, and nitrogen, the remainder comprising iron)), alloy 800H (an alloy including between about 30.0 weight percent and about 35.0 weight percent nickel, between about 19.0 weight percent and about 23.0 weight percent chromium, and greater than about 39.5 weight percent iron), Haynes® 242® alloy (e.g., an alloy including about 25.0 weight percent molybdenum, about 8.0 weight percent chromium, about 1.5 weight percent iron, less than about 1.0 weight percent cobalt, and the remainder comprising nickel), Hastealloy® N (an alloy including about 7.0 weight percent chromium, about 17.0 weight percent molybdenum, about 5.0 weight percent, less than about 1.0 weight percent silicon, and the remainder comprising nickel), Hastealloy® X (an alloy including about 9.0 weight percent molybdenum, about 20.0 weight percent chromium, about 20.0 weight percent iron, and the balance comprising nickel), HN80M-VI (an alloy comprising about 8.0 weight percent molybdenum, about 12.0 weight percent chromium, the remainder comprising nickel), MONICR (an alloy comprising about 18.0 weight percent molybdenum, about 7.0 weight percent chromium, about 2.0 weight percent iron, the remainder comprising nickel), alloy 600 (an alloy including greater than about 72.0 weight percent of nickel and/or cobalt, between about 6.0 weight percent and about 10.0 weight percent iron, between about 14.0 weight percent and about 17.0 weight percent chromium, and less than about 1.0 weight percent of each of copper and manganese), alloy 617 (an alloy including about 44.5 weight percent nickel, between about 20.0 weight percent and about 24.0 weight percent chromium, between about 10.0 weight percent and about 15.0 weight percent cobalt, between about 8.0 weight percent and about 10.0 weight percent molybdenum, less than about 3.0 weight percent iron, and less than about 1.0 weight percent silicon), a 2¼Cr—1Mo alloy (a steel alloy including about between about 2.0 weight percent and about 2.5 weight percent Cr and between about 0.90 weight percent and about 1.1 weight percent Mo), nickel, copper, cobalt, aluminum, silicon carbide, silicon nitride, alumina ($Al_2O_3$), zirconia ($ZrO_2$), boron carbide, silicon boride, other ceramic materials, or combinations thereof. In some embodiments, the matrix material comprises at least one metal material and at least one ceramic material. By way of nonlimiting example, the matrix material may include nickel and silicon carbide.

In some embodiments, the matrix material comprises aluminum nitride, silicon carbide, nickel, chromium, beryllium, SiC—$Zr_xSi_y$, FeCrAl, silicon carbide (SiC) including nanomaterials (e.g., carbon fibers dispersed therein), silicon carbide including nickel dispersed therein, nickel including silicon carbide dispersed therein, silicon carbide including chromium, beryllium, or both dispersed therein, beryllium including silicon carbide, chromium, or both dispersed therein, chromium including silicon carbide, beryllium, or both dispersed therein, a composite comprising zirconium alloy (e.g., Zircaloy) and silicon carbide, a zirconium alloy and one or both of silicate and aluminum nitride. In some embodiments, the matrix material comprises a layered structure having a first layer comprising, for example, a metal material, a second layer comprising, for example, a ceramic material over the first layer, and a third layer comprising, for example, a cermet material over the second layer.

The matrix material may include one or more additives, such as, for example, carbon fibers, carbon nanotubes, carbon nanodiamonds, another material, or combinations thereof. In some embodiments, the additive may increase a corrosion resistance, a resistance to one or more chemicals, or a combination thereof, of the resulting structure comprising the matrix material. In some embodiments, only surfaces of the matrix material that are configured to be in contact with a thermal transfer material include the one or more additives.

The sacrificial material may include a material formulated and configured not to form metallurgical bonds with the matrix material, at least at conditions at which the matrix material is bonded (e.g., sintered) responsive to exposure to energy. In other words, the sacrificial material may comprise a material that does not substantially react with the matrix material under formation conditions of the matrix material. The sacrificial material may be referred to herein as a so-called "non-bonding" material. In some embodiments, the sacrificial material may exhibit a melting temperature greater than a melting temperature of the matrix material.

By way of nonlimiting example, the sacrificial material may include one or more of flexible high temperature carbon fiber composites, one or more so-called high temperature "flexible ceramics" comprising inorganic composites (e.g., a combination of one or more ceramic materials and various polymers, which polymers polymerize responsive to exposure to an elevated temperature to form the inorganic composite), a glass material (e.g., a high temperature glass material), other materials, or combinations thereof. By way of nonlimiting example, the sacrificial material may include a polymer material including one or more additives dispersed therein. The one or more additives may include carbon fibers, carbon nanotubes, carbon nanodiamonds, or other fibers (e.g., nanofibers). In some embodiments, the additive may constitute up to about 50 weight percent of the sacrificial material. The additives may facilitate formation of a flexible sacrificial material that may be removed from the structure after formation of the structure. In some embodiments, the additives increase a strength and stiffness of the sacrificial material, increase a heat resistance and chemical resistance thereof, or both. In some embodiments, the additives comprise carbon nanofibers.

In some embodiments, the sacrificial material comprises a so-called "flexible ceramic" material comprising at least two polymers to form a polymer blend. In some such embodiments, the sacrificial material may be stable at temperatures greater than about 600° C., or even at temperatures greater than about 1,000° C. The sacrificial material may include one or more ceramic materials dispersed in the polymer blend. The ceramic materials may include, for example, silicon carbide, silicon nitride, alumina, or other ceramic materials.

In other embodiments, the sacrificial material may include a material exhibiting a relatively low melting temperature relative to the melting temperature of the matrix material. In some such embodiments, the sacrificial material may be removed after fabrication of the structure to form channels at locations corresponding to the locations from which the sacrificial material was removed. By way of nonlimiting example, the sacrificial material may be removed such as by melting the sacrificial material. In other embodiments, the sacrificial material is removed by reacting the sacrificial material or dissolving the sacrificial material in a solvent. The melting point of the sacrificial material may be less than about 400° C. in some embodiments, such as where the additive manufacturing method comprises AJP. In other embodiments, the melting point of the sacrificial material may be less than about 1,000° C., such as where the additive manufacturing method comprises a powder-based process (e.g., SLS).

In some embodiments, the sacrificial material may comprise a resin-based material. By way of nonlimiting example, the sacrificial material may comprise a high temperature polymer, such as one or more of polyphenylene sulfide (PPS), polyetheretherketone (PEEK), polyetherketone (PEK), polyphthalamide (PPA), how water moldable polyphthalamide (PPA), polyetherketoneketone (PEKK), polyimide (TPI), high temperature nylon (HTN), polysulfone (PSU), polyethersulfone (PES), polyetherimide (PEI), and liquid crystal polymer (LCP).

After forming the feed material on the surface of the substrate, or substantially concurrently therewith, the feed material may be exposed to energy (e.g., a laser) to form metallurgical bonds between particles of the matrix material and form a substantially unitary mass comprising at least the matrix material. In some embodiments, such as where the sacrificial material comprises a low melting point material, the sacrificial material may be exposed to energy to form bonds between adjacent particles thereof. In other embodiments, the sacrificial material may not be substantially exposed to energy such that particles of the sacrificial material do not substantially form bonds with other particles of the sacrificial material or with particles of the matrix material. In embodiments where the sacrificial material exhibits a higher melting temperature than the matrix material, exposing the matrix material to the energy may not substantially form bonds between particles of the sacrificial material and particles of the matrix material or between different particles of the sacrificial material.

Figure 3B:
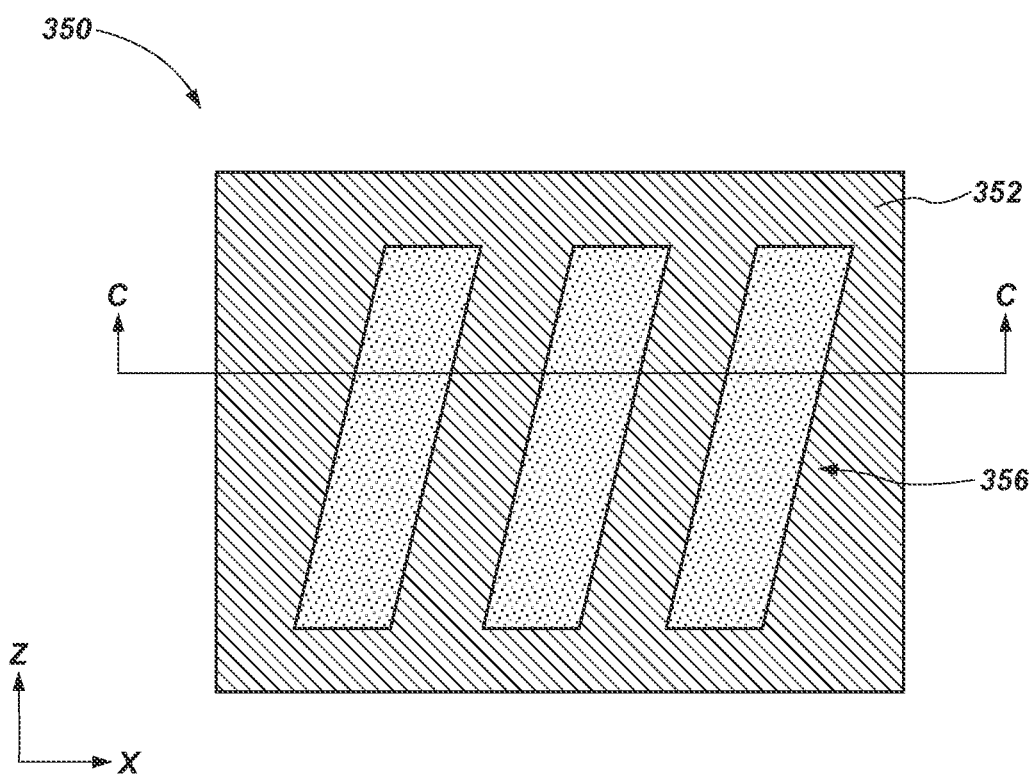
FIG. 3B and FIG. 3C are a respective top view and cross-sectional view of a structure fabricated by additive manufacturing, in accordance with embodiments of the disclosure.
Figure 3C:
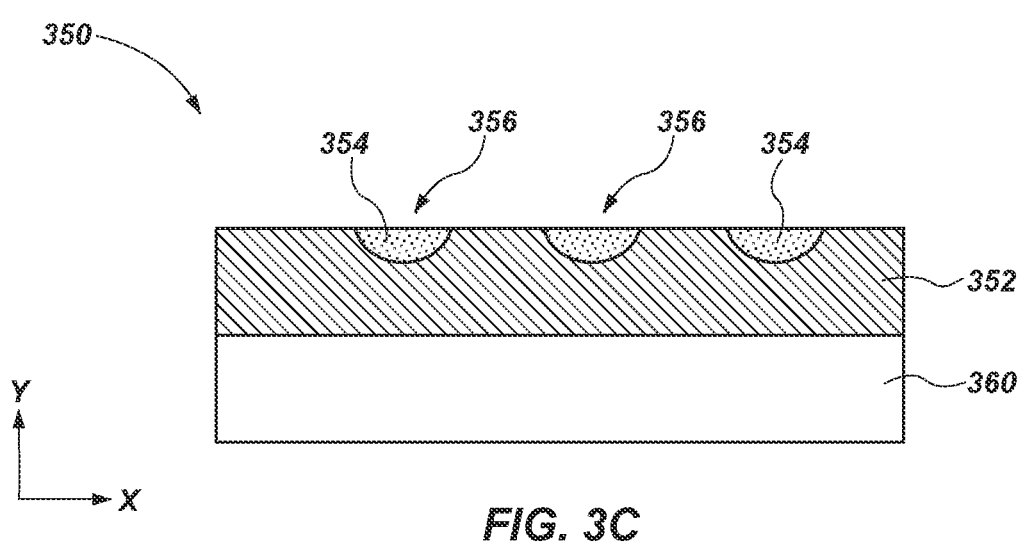

FIG. 3B is a simplified top view of a structure 350 after formation of the at least a first thickness of the structure. FIG. 3C is a simplified cross-sectional view of the structure 350 taken along section line C-C of FIG. 3B. In some embodiments, the structure 350 overlies a substrate 360. The structure 350 may include a matrix material 352 including any of the materials described above. The matrix material 352 may form a substantially continuous body of bonded materials. A sacrificial material 354 may be located within portions of the matrix material 352 and may define channels 356 of the structure 350. The sacrificial material 354 may comprise the same materials described above with reference to the matrix material.

In some embodiments, a composition of the matrix material 352 may vary in one or more dimensions, depending on a location of the matrix material 352 in the structure 350. By way of nonlimiting example, the composition of the matrix material 352 may vary in, for example, at least one of the x-direction and the y-direction. In further embodiments, the composition of the matrix material 352 varies in the z-direction, as different layers of the structure 350 are manufactured.

In some embodiments, the composition of the matrix material 352 varies with a distance from the channels 356. In some embodiments, the matrix material 352 may exhibit a higher melting temperature at locations proximate the channels 356 than at locations more distal from the channel regions 356. As only one example, the matrix material 352 may comprise a greater amount of a ceramic material proximate the channels 356 than at locations distal from the channels 356. The locations distal from the channels 356 may comprise a greater weight percent of a metal material than portions of the matrix material 352 located proximate the channels 356. Accordingly, with reference to FIG. 3A, the feed material may be formed on the substrate 360 to exhibit a gradient during act 302.

Although FIG. 3B and FIG. 3C have been described and illustrated as including the structure 350, the matrix material 352, and the channels 356 exhibiting a particular shape, the disclosure is not so limited. As will be described herein, the structure 350, the matrix material 352, and the channels 356 may exhibit different shapes.

With reference again to FIG. 3A, act 304 includes repeating act 302 until a near net shape of the structure is formed. After forming the first thickness of the structure 350 (FIG. 3B, FIG. 3C), a delivery nozzle (e.g., the powder delivery nozzle 106 (FIG. 1), the delivery nozzle 230 (FIG. 2)) may be moved a predetermined distance relative to the structure 350, which distance may correspond to a thickness of the thickness (e.g., layer) of the structure previously formed.

After moving the structure 350 relative to a deposition head, another thickness of the feed material may be disposed on the exposed surface of the structure 350. The another thickness of the feed material may be patterned over the exposed surface of the structure 350 in a desired pattern to form another thickness of the structure 350 having a desired cross-sectional size and shape. The feed material may be exposed to energy to form metallurgical bonds between adjacent particles of the feed material (e.g., adjacent particles of the matrix material). Act 304 may include repeating act 302 until the structure having a near net shape is formed.

Act 306 includes optionally exposing the structure to an in-situ heat treatment process. Exposing the structure to an in-situ heat treatment process may relax stresses in the material of the structure. The in-situ heat treatment process may include relaxing a grain structure of the structure, such as a grain structure of the matrix material. In some embodiments, the in-situ heat treatment process may include annealing the structure. In some embodiments, the structure is exposed to a heat source (e.g., laser energy or another heat source) during manufacturing thereof. Without wishing to be bound by any particular theory, it is believed that exposing the structure to the in-situ heat treatment process may substantially prevent formation of brittle phases of the matrix material. Accordingly, the final structure may exhibit improved properties (e.g., a lower likelihood of breaking).

Although the method 300 has been described and illustrated as including act 306 after act 304, the disclosure is not so limited. In some embodiments, act 306 may be performed prior to formation of a structure having a near net shape. In other words, act 306 may be performed after act 302, during act 304, or a combination thereof. In some embodiments, act 306 is performed after a number of layers of the structure have been formed, such as after every layer is formed, after every about 2 layers, every about 4 layers, every about 10 layers, are formed.

Act 308 includes removing sacrificial materials from the structure to form channels in the structure. In some embodiments, the sacrificial materials are removed physically, such as by mechanically removing the sacrificial material from the structure. In some embodiments, the sacrificial material is not bonded to the matrix material and may be removed by, for example, using compressed air to remove the sacrificial material. As another example, the sacrificial material may be removed by pulling or pushing the sacrificial material from the structure. As yet another example, the sacrificial material (e.g., the structure) may be exposed to ultrasonic waves, which may fracture the sacrificial material. The fractured sacrificial material may thereafter be removed from the structure. In other embodiments, the sacrificial material is removed by exposing the sacrificial material to a temperature sufficient to melt the sacrificial material and the sacrificial material is allowed to flow out of the structure, leaving the channels where the sacrificial material was formed. In some such embodiments, the sacrificial material may comprise a polymer material that is melted responsive to exposure to a sufficient temperature. The sacrificial material may be removed in-situ during fabrication of additional layers of the structure, or may be removed after fabrication of the structure is complete.

In yet other embodiments, the sacrificial material is removed by chemically reacting the sacrificial material and forming one or more reaction byproducts to be removed from the channel regions. In further embodiments, the sacrificial material is removed by exposing the sacrificial material to a solvent in which the sacrificial material may be dissolved and removed from the channel regions.

In some embodiments, removal of the sacrificial material from the structure may form channel regions having a desired surface roughness. The surface roughness of the channel regions may depend on the type of sacrificial material, the method by which the sacrificial material is removed from the structure, or a combination thereof. In some embodiments, after removal of the sacrificial material, the channel regions are exposed to mechanical polishing to reduce a surface roughness thereof. In other embodiments, channel regions are exposed to energy from the energy source (e.g., from a laser) to locally heat and melt the surface of the channel regions and reduce a surface roughness thereof.

Act 310 includes minor machining of the near net shape to form the final structure having a desired shape and a desired size within acceptable tolerance. The machining process may include modifying one or more dimensions of the structure to form a machined structure exhibiting a desired shape and a desired size. As one nonlimiting example, peripheral portions of the structure may be removed (e.g., ground, etched, etc.) to provide a machined structure exhibiting a diameter and a height suitable for a desired application.

By way of nonlimiting example, the machining process may include subjecting the structure to a centerless grinding process to form the machined structure exhibiting a desired diameter and a desired height. In some embodiments, the centerless grinding process includes inserting the structure onto a guide and exposing a portion of a peripheral sidewall of the structure, moving and rotating (e.g., spinning) the structure along the guide using a feed wheel, and removing a portion of the peripheral sidewall using a grinding wheel (e.g., a diamond resin grinding wheel) operatively associated with the guide. The grinding wheel may remove (e.g., grind) a portion of the peripheral sidewall of the structure during each pass of the structure across the grinding wheel. The amount of the final structure removed by the grinding wheel during each pass may be controlled to achieve the desired diameter of the machined structure. The removal (e.g., grinding) rate of the grinding wheel in terms of a depth of material removed during each pass of the grinding wheel may be substantially constant, or may be varied. The removal rate of the grinding wheel may, for example, be decreased as the desired diameter of the machined structure is approached. After removal of any materials desired to be removed from the structure, the structure may be formed to a desired size and a desired shape.

Although FIG. 3B and FIG. 3C illustrate the structure 350 as having a particular cross-sectional shape, the disclosure is not so limited. The method 300 may be used to additively manufacture one or more components or one or more types of heat exchangers.

Although FIG. 3A through FIG. 3C have described forming the structure 350 with a sacrificial material 354 to form the channels 356, the disclosure is not so limited. In other embodiments, the channels 356 may be formed by forming the matrix material 352 to have a shape of the channel 356 and leaving voids in locations corresponding to the channels 356.

Without being bound by any particular theory, it is believed that exposing the structure to an in-situ heat treatment process may facilitate fabrication of a structure exhibiting an improved tolerance to changes in thermal load and thermal cycling when used in a heat exchanger. For example, the structure may comprise a helical coil used in a heat exchanger and may be exposed to different thermal loads and thermal cycling without cracking or otherwise failing. By way of contrast, conventionally formed helical coils exposed to different thermal loads and thermal cycling may fail due to the thermal stresses to which they are exposed. Accordingly, exposing the structure to the in-situ heat treatment process may facilitate fabrication of a structure exhibiting improved thermal properties responsive to exposure to changing thermal loads.

Without being bound by any particular theory, it is believed that forming the structures with a sacrificial material and removing the sacrificial material after forming the structure may facilitate fabrication of channels having a relatively smoother surface than structures in which voids are formed by not placing additive manufacturing feed materials at locations corresponding to the channels. The smoother surfaces of the channel regions may facilitate a reduced pressure drop as fluids flow therethrough during use and operation of the structure.

Figure 4A:
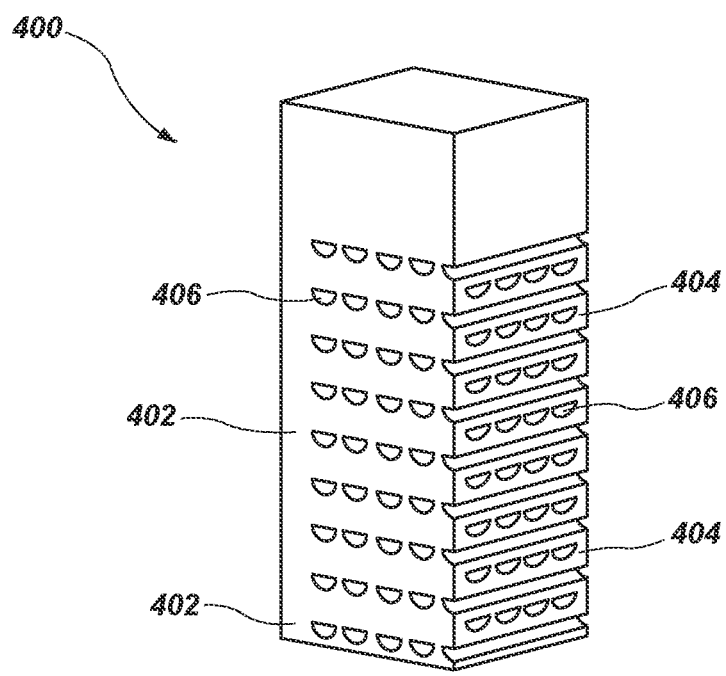
FIG. 4A through FIG. 4C illustrate a printed circuit heat exchanger fabricated according to methods described herein, in accordance with embodiments of the disclosure.

FIG. 4A is a simplified schematic of a printed circuit heat exchanger (PCHE) 400 that may be manufactured using additive manufacturing, in accordance with embodiments of the disclosure. The printed circuit heat exchanger 400 may comprise stacked layers comprising alternating plates 402, 404 defining channels 406. The plates 402 may be positioned and configured to receive a first thermal transfer material in the channels 406 and the plates 404 may be positioned and configured to receive a second thermal transfer material in the channels 406 thereof. As the first thermal transfer material and the second thermal transfer material pass through the respective plates 402, 404, heat may be transferred between the first thermal transfer fluid and the second thermal transfer fluid.

Figure 4B:
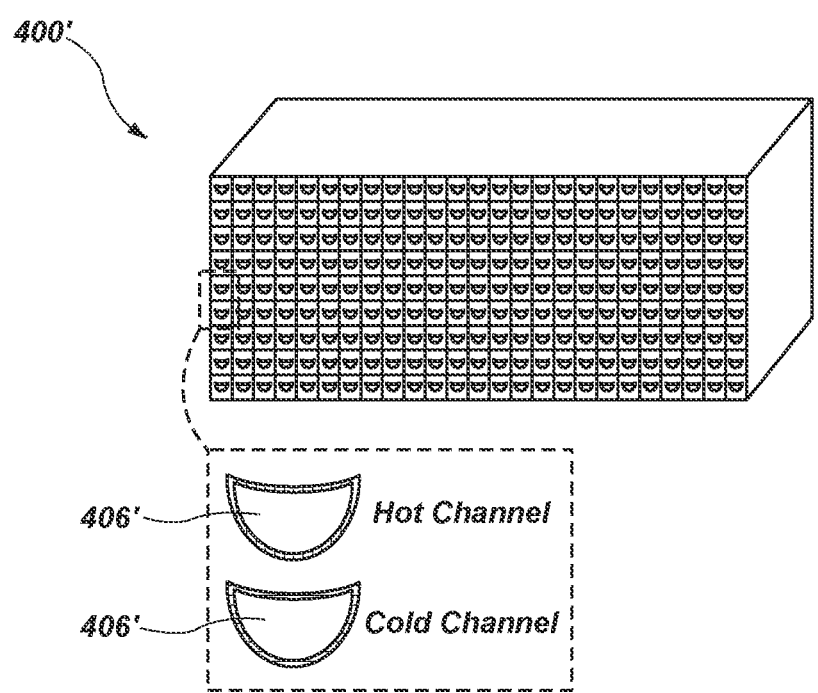

FIG. 4B is a simplified perspective view of a printed circuit heat exchanger 400' wherein inlets and outlets of the channels 406' of the adjacent plates are not oriented substantially perpendicular to each other, in accordance with embodiments of the disclosure. For example, the channels 406' may be oriented substantially parallel with each other. In some embodiments, the printed circuit heat exchanger 400' may be configured such that the channels 406' including a hot fluid direct the hot fluid in a direction that is counter current to the direction of flow of the cold fluid in the other channels 406'. Since the printed circuit heat exchanger 400' is formed by additive manufacturing, the printed circuit heat exchanger 400' may include any number of channels 406'.

Although FIG. 4B illustrates that the channels 406' have a semicircular cross-sectional shape, the disclosure is not so limited. The channels 406' may be formed to have any cross-sectional shape, such as triangular, elliptical, rectangular, square, circular, semi-circular, star, hexagonal, or another shape.

Figure 4C:
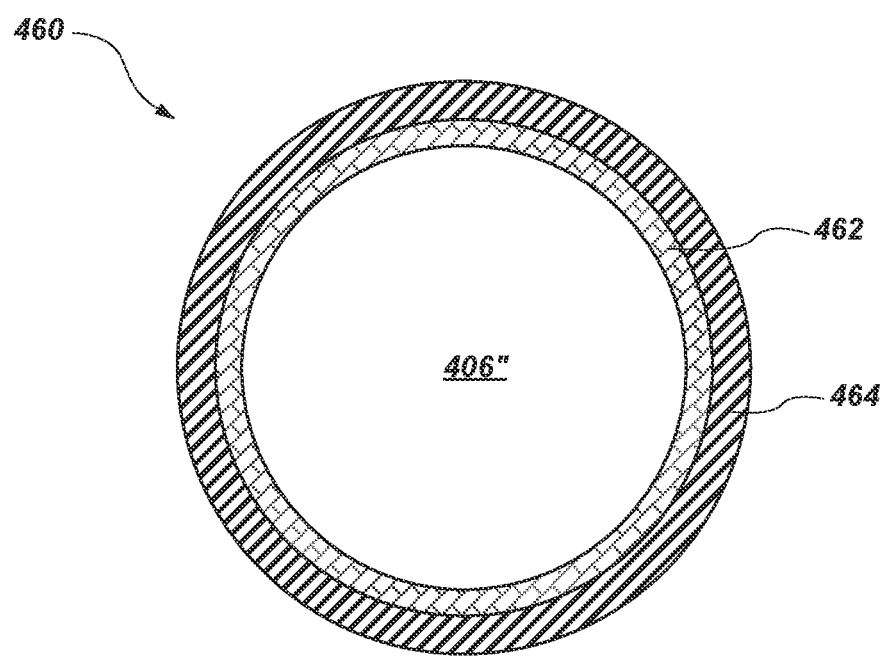

FIG. 4C is a cross-sectional view of a portion of a structure 460 defining a channel 406", in accordance with embodiments of the disclosure. The channels 406, 406' described above could be replaced with the channel 406". The channel 406" may be defined by a first matrix material 462 defining outer walls of the channel 406". A second matrix material 464 may surround the first matrix material 462. In some embodiments, a thickness of the first matrix material 462 may be less than a thickness of the second matrix material 464.

The first matrix material 462 may substantially surround the channel 406" such that, in use and operation, any fluid within the channel 406" may contact the first matrix material 462. In some embodiments, the first matrix material 462 comprises a material exhibiting a higher melting temperature than the second matrix material 464. In some embodiments, the first matrix material 462 comprises a ceramic material and the second matrix material 464 comprises a metal material. In some embodiments, the first matrix material 462 may include one or more additives formulated and configured to exhibit a chemical resistance, a corrosion resistance, or both, to a thermal transfer material to which the first matrix material 462 is exposed. The one or more additives may include carbon fibers, carbon nanotubes, carbon nanodiamonds, another material, or combinations thereof.

In some embodiments, the first matrix material 462 has a thickness less than a thickness of the second matrix material 464. The first matrix material 462 may include a composite material, such as a flexible high temperature carbon fiber composite material and the second matrix material 464 comprises one or more of the matrix materials described above.

Although FIG. 4C illustrates only one channel 406", it will be understood that the channels 406, 406' described with reference to FIG. 4A and FIG. 4B may be replaced with the channel 406". In some such embodiments, a majority of the printed circuit heat exchangers 400, 400' may comprise the second matrix material 464, the portions immediately adjacent the channel regions 406" comprising the first matrix material 462. In addition, although FIG. 4C illustrates that the channel 406" has a circular cross-sectional shape, the disclosure is not so limited and the cross-sectional shape of the channel 406" may be triangular, elliptical, oval, rectangular, square, circular, semi-circular, star, hexagonal, or another shape.

The printed circuit heat exchanger 400 may be fabricated according to embodiments described herein. In some embodiments, an entirety of the printed circuit heat exchanger 400 may be fabricated by additive manufacturing and adjacent plates 402, 404 may be bonded to each other without welding or diffusion bonding the plates 402, 404 together, since they may be fabricated in the same additive manufacturing process. By way of comparison, conventional printed circuit heat exchanger formation involves photochemical etching of the channels in metal plates thereof and diffusion bonding of metal plates to join the metal plates together and form a heat exchanger core. Heat exchanger headers may be attached to the core by means of welding or brazing. However, photochemical etching of the channels and diffusion bonding of the plates may form irregularities in shape and dimensions of the channel regions, resulting in undesired variations in flow therethrough, undesired pressure drop, insufficient heat transfer, or combinations thereof. In addition, nickel-based superalloys from which some printed circuit heat exchangers are formed are unable to withstand elevated temperatures and pressures that may be required of the printed circuit heat exchangers. Further still, coupling of the heat exchanger headers to the heat exchanger core may be difficult. Forming the printed circuit heat exchanger according to the methods described herein may overcome the aforementioned shortcomings of conventionally formed printed circuit heat exchangers.

Figure 5A:
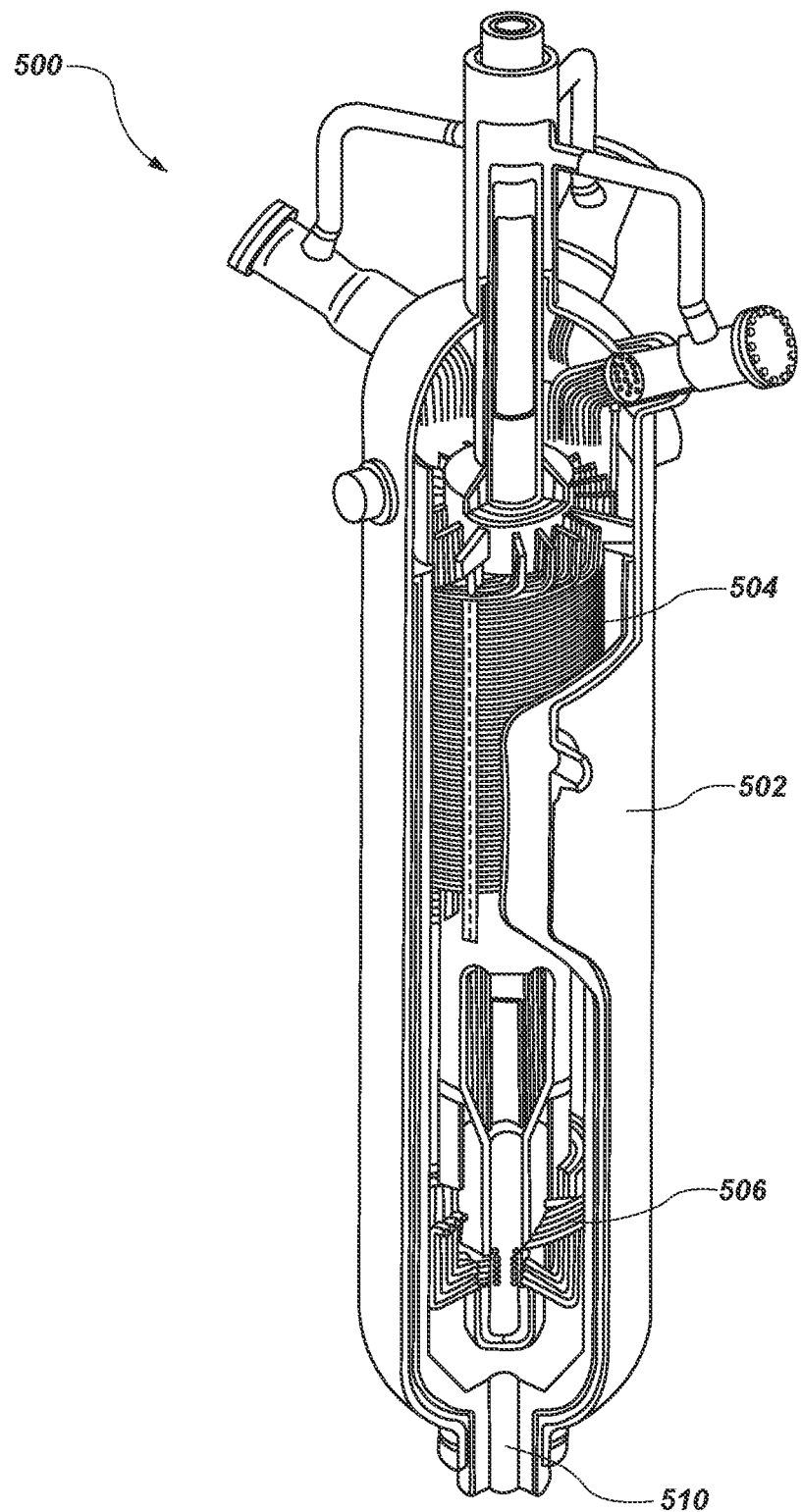
FIG. 5A and FIG. 5B are simplified cutaway view of a helical coil heat exchanger, in accordance with embodiments of the disclosure.

FIG. 5A is a simplified cutaway view of a helical coil heat exchanger 500 that may be formed according to the methods described herein. At least a portion of the helical coil heat exchanger 500 may be formed by additive manufacturing, as described herein. The helical coil heat exchanger 500 may include a shell 502 surrounding helical coils.

In some embodiments, the helical coils may be formed by additive manufacturing. The helical coils may comprise, for example, an upper bundle 504 and a lower bundle 506. The lower bundle 506 may be located in an economizer section of the helical coil heat exchanger 500 and may, therefore, be exposed to thermal transfer materials having a relatively lower temperature than the thermal transfer materials to which the upper bundle 504 is exposed. In some embodiments, the upper bundle 504 may be formed from different materials than the lower bundle 506.

Figure 5B:
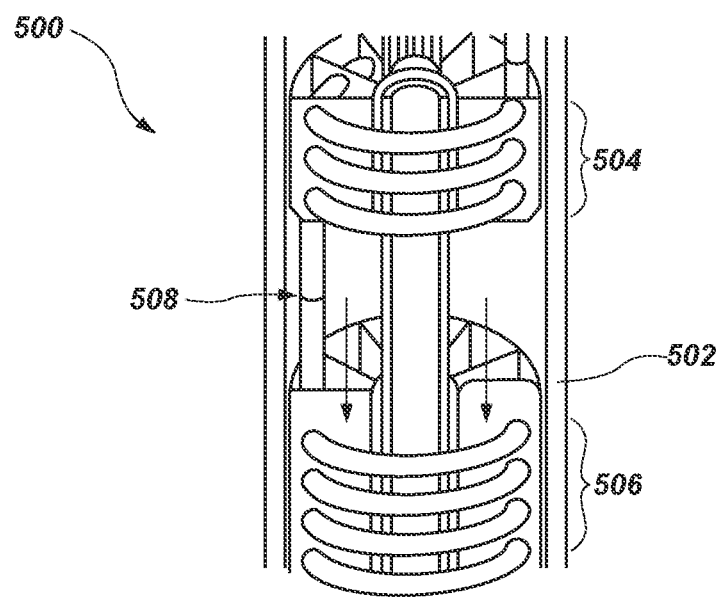

FIG. 5B is a simplified cutaway view of a portion of the helical coil heat exchanger 500. In a conventional helical coil heat exchanger, the lower bundle 506 may be welded to the upper bundle 504. In accordance with embodiments herein, the lower bundle 506 may be connected to the upper bundle 504 at location 508 without a weld, since the lower bundle 506 and the upper bundle 504 may be formed together by additive manufacturing. In some embodiments, the lower bundle 506 and the upper bundle 504 may comprise different materials formulated and configured for specific operating conditions thereof. As only one example, the upper bundle 504 may be exposed to higher temperatures than the lower bundle 506 and may, therefore, be formed from a material exhibiting a higher melting temperature than the lower bundle 506. By way of nonlimiting example, the upper bundle 504 may be formed from a ceramic material or may be coated with a ceramic material and the lower bundle 506 may comprise a metal material.

In some embodiments, a temperature of lower bundle 506 and the upper bundle 504 may increase with a distance from a thermal transfer material inlet 510 (FIG. 5A). In some such embodiments, the lower bundle 506 may exhibit an increasing melting temperature with a distance from the inlet 510. As one example, the lower bundle 506 may comprise an increasing weight percent of a ceramic material with a distance from the inlet 510. The upper bundle 504 may comprise a further increasing weight percent of the ceramic material with an increasing distance from the inlet 510. Accordingly, the material properties of the upper bundle 504 and the lower bundle 506 may be tailored for their specific applications in the helical coil heat exchanger 500.

The helical coil heat exchanger 500 may be fabricated according to the methods described herein. In some embodiments, the helical coil (e.g., the upper bundle 504, the lower bundle 506, or both) may be fabricated by additive manufacturing methods. In some embodiments, the helical coil may be exposed to an in-situ heat treatment process to form a structure exhibiting improved thermal stress properties in use and operation thereof.

In some embodiments, the helical coil may be fabricated to exhibit various wall thicknesses. By way of nonlimiting example, the helical coil may be fabricated such that the wall thickness thereof changes with a distance from the inlet 510 (FIG. 5A). For example, the wall thickness may increase with an increasing distance from the inlet 510.

Figure 6:
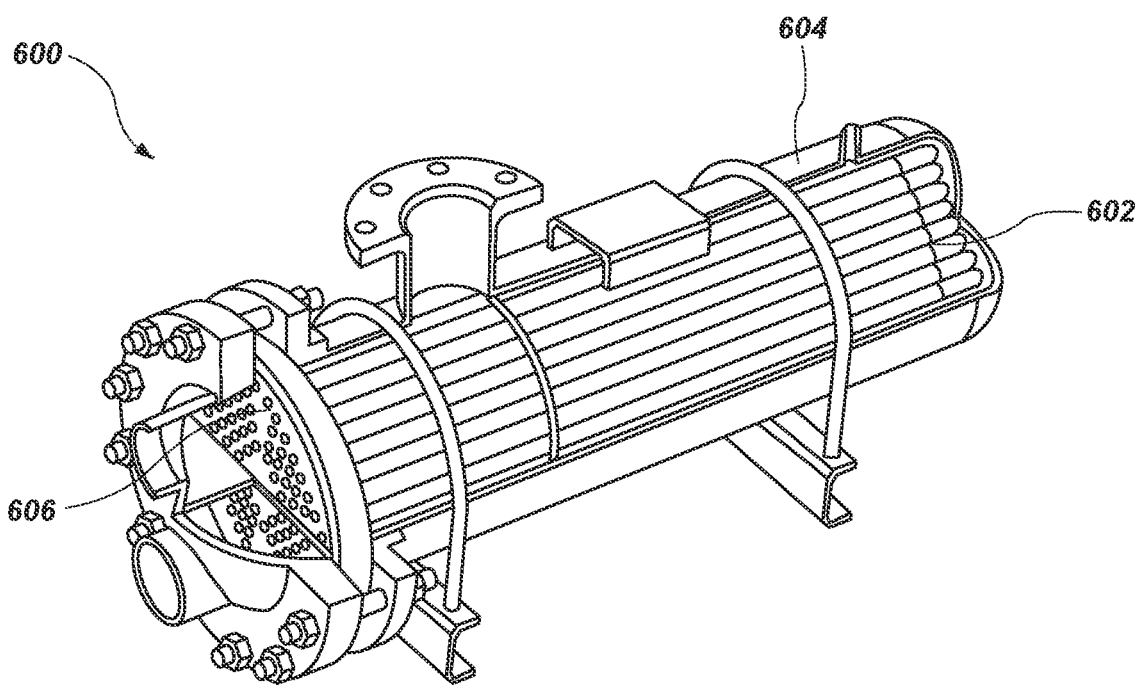
FIG. 6 is a simplified schematic of a shell-and-tube heat exchanger, in accordance with embodiments of the disclosure.

FIG. 6 is a simplified schematic of a shell-and-tube heat exchanger 600, in accordance with embodiments of the disclosure. The heat exchanger 600 may comprise tubes 602 surrounded by a shell 604. The tubes 602 may be connected to a tubesheet 606. Conventional shell-and-tube heat exchangers include tubes 602 that are either welded to the tubesheet 606 or are expanded (in a process known as tube rolling) wherein the tubes are expanded into the tubesheet 606 to form a seal between the tubes and the tubesheet. In accordance with embodiments described herein, since the tubes 602 and the tubesheet 606 may be formed by additive manufacturing, they may be integral with each other and may not require welding or tube rolling to form a fluid tight seal therebetween.

In some embodiments, the channels of the heat exchangers described herein (e.g., the channels 356, 406, 406', 406", the upper bundle 504, the lower bundle 506, the tubes 602) may be fabricated to exhibit desired properties. Since the channels are fabricated by additive manufacturing, in some embodiments, the channels may be fabricated to exhibit internal structures which may facilitate formation of localized turbulence within such channels. For example, the channels may be fabricated with structures, such as modified surface features, which may generate localized turbulence. The localized turbulence may further enhance convective heat transfer through the heat exchanger.

In some embodiments, one or more modular heat exchangers may be fabricated according to the methods described herein. Each modular heat exchanger may be fabricated to exhibit substantially the same design and heat removal capacity. In other embodiments, the modular heat exchangers may be interchangeable with different flow designs (e.g., different channels, different number of channels, etc.). The modular heat exchangers may be arranged in series or parallel and may be configured to increase a heat transfer capacity of a system including the modular heat exchangers.

Further, since the components of the heat exchangers may be fabricated modularly, defects in a heat exchanger may be replaced with minimum down time by taking a failing heat exchanger out of service and replacing the failing part thereof with a new modular part fabricated by additive manufacturing. As one example, failure or a leak between one or more plates 402, 404 of a printed circuit heat exchanger 400 (FIG. 4A) may be fixed by removing the damaged plate, additively manufacturing a new plate on an existing plate 402, 404.

Figure 7A:
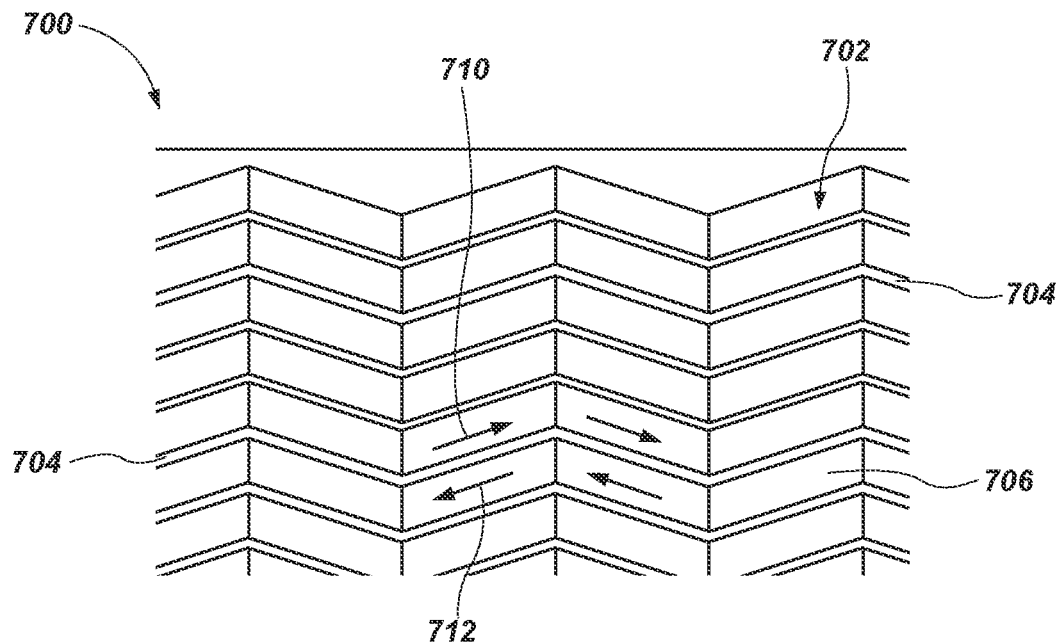
FIG. 7A and FIG. 7B are simplified cross-sectional views of a printed circuit heat exchanger, in accordance with embodiments of the disclosure.
Figure 7B:
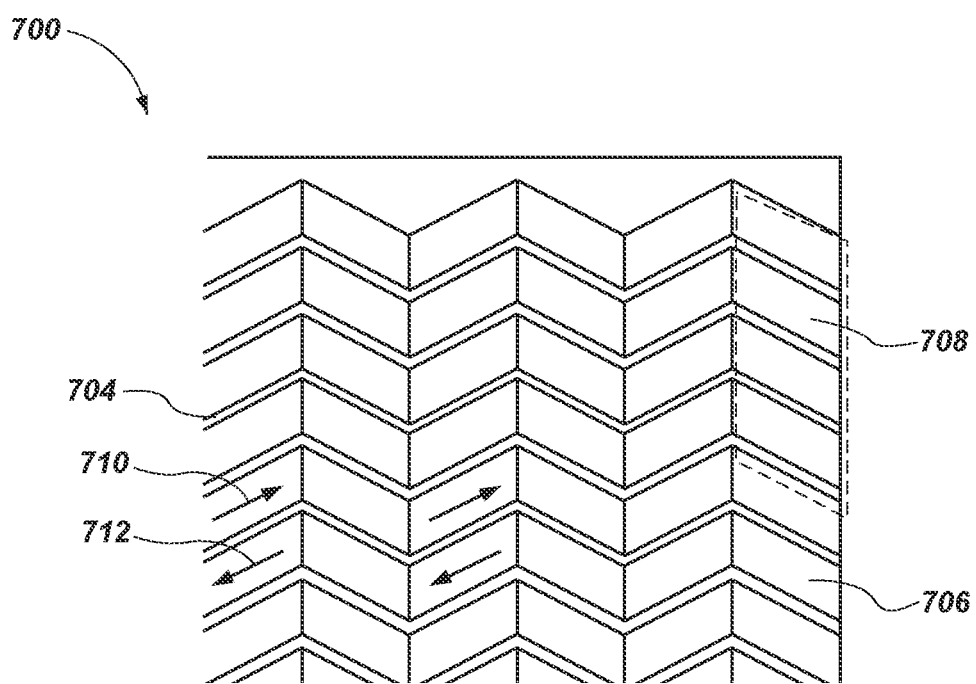

FIG. 7A and FIG. 7B are simplified cross-sectional views of a printed circuit heat exchanger 700. FIG. 7A illustrates the printed circuit heat exchanger 700 having at least one damaged portion 702 wherein walls 704 between at least some channels 706 are broken and/or damaged. As indicated at arrow 710, a hot fluid may flow through channels 706 counter currently to a cold fluid flowing through adjacent channels 706, as indicated at arrow 712.

With continued reference to FIG. 7A, the damaged walls 704 may result in undesired leaking between different channels 706, including between channels 706 having a cold thermal transfer material therein and other channels 706 having a hot thermal transfer material therein. In some embodiments, the printed circuit heat exchanger 700 may be taken out of service and the damaged portions 702 may be removed, such as by machining, grinding, or other material removal processes. The remaining portion of the printed circuit heat exchanger 700 may be placed in an additive manufacturing apparatus and the damaged portions 702 that were removed may be replaced with one or more replacement portions 708 (indicated by the dashed box in FIG. 7B) by additively manufacturing the replacement portions 708 on the printed circuit heat exchanger 700.

In other embodiments, the printed circuit heat exchanger may be damaged to such an extent that repairing portions thereof may not be feasible. In some such embodiments, the printed circuit heat exchanger 700 may be removed from service and replaced with another printed circuit heat exchanger 700 formed by an additive manufacturing process.

Accordingly, one or more components of a heat exchanger may be fabricated by additive manufacturing. Additively manufacturing the one or more components may facilitate fabrication of heat exchangers without wasting a substantial amount of materials, as in conventional fabrication processes. The methods described herein may substantially reduce a cost associated with fabrication and repair of heat exchangers. In addition, additive manufacturing may facilitate use of a greater number of materials and material compositions (e.g., gradients) within the components of the heat exchanger. The additive manufacturing process may facilitate formation of components of the heat exchanger from different materials and may facilitate joining of dissimilar materials (e.g., ceramic materials to metal materials) without, for example, diffusion bonding. Accordingly, the structures fabricated according to embodiments described herein may exhibit improved heat transfer properties compared to conventional heat exchangers. In addition, the structures fabricated according to embodiments disclosed herein may exhibit a reduced amount of stresses (e.g., thermal stresses) during use and operation compared to conventional heat exchangers. For example, the materials may exhibit appropriate thermal stress responses during transient conditions when a load on an associated heat exchanger changes. The materials may exhibit adequate strength and creep resistance while also withstanding the required pressure differential between hot and cold side.

The heat exchangers and heat exchanger components described herein may be used in, for example, nuclear reactor systems (e.g., in small modular reactors (SMR) including molten salts, high temperature gases, etc.), aerospace systems, steam generators, metal and glass refining, chemical refining, oil refining, refining of synthetic fuels and biofuels, hydrogen production, ethanol production, geothermal heating applications, desalination applications, biomass and paper drying applications, food and beverage processing, district heating, and other applications.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A method of forming at least a component of a heat exchanger, the method comprising:
introducing a feed material comprising a matrix material and a sacrificial material on a surface of a substrate;
selectively exposing at least the matrix material to focused energy to form bonds between particles of the matrix material and form a first thickness of a structure, the first thickness of the structure exhibiting a varying weight percent of at least one metal in at least one direction;
introducing additional feed material comprising the matrix material over the first thickness of the structure;
selectively exposing the additional feed material to focused energy to form a second thickness of the structure; and
removing the sacrificial material from the structure to form at least one channel in the structure.

2. The method of claim 1, wherein removing the sacrificial material from the structure comprises melting the sacrificial material.

3. The method of claim 1, wherein removing the sacrificial material comprises physically removing the sacrificial material from the structure.

4. The method of claim 1, wherein introducing a feed material comprising a matrix material and a sacrificial material on a surface of a substrate comprises introducing a sacrificial material having a higher melting temperature than the matrix material on the surface of the substrate.

5. The method of claim 1, further comprising exposing the first thickness of the structure and the second thickness of the structure to a heat treatment process prior to removing the sacrificial material from the structure.

6. The method of claim 1, wherein selectively exposing at least the matrix material to focused energy comprises exposing the matrix material to energy from a laser.

7. The method of claim 1, wherein removing the sacrificial material from the structure comprises:
chemically reacting the sacrificial material to form one or more reaction byproducts; and
removing the one or more reaction byproducts from the structure.

8. The method of claim 1, wherein introducing a feed material comprises introducing a teed material comprising a resin material, the matrix material, and the sacrificial material dispersed within the resin material.

9. The method of claim 1, wherein introducing a feed material comprising a matrix material on a surface of a substrate comprises introducing a feed material comprising a matrix material comprising at least one ceramic material and at least one metal material on the surface of the substrate.

10. The method of claim 1, wherein introducing a feed material comprising a matrix material and a sacrificial material on a surface of a substrate comprises introducing a feed material comprising a sacrificial material comprising a flexible high temperature carbon fiber composite material on the surface of the substrate.

11. The method of claim 1, wherein introducing a feed material comprising a matrix material and a sacrificial material on a surface of a substrate comprises introducing a feed material comprising a sacrificial material comprising one or more of polyphenylene sulfide (PPS), polyetheretherketone (PEEK), polyetherketone (PEK), polyphthalamide (PPA), how water moldable polyphthalamide (PPA), polyetherketoneketone (PEKK), polyimide (TPI), high temperature nylon (HTN), polysulfone (PSU), polyethersulfone (PES), polyetherimide (PEC), and liquid crystal polymer (LCP) on the surface of the substrate.

12. The method of claim 1, further comprising exposing the at least one channel to energy after removing the sacrificial material from the structure to reduce a surface roughness of the at least one channel.

13. The method of claim 1, wherein removing the sacrificial material from the structure to form at least one channel in the structure comprises forming the structure to exhibit a varying composition with a distance from the at least one channel.

14. The method of claim 1, wherein selectively exposing at least the matrix material to focused energy to form bonds between particles of the matrix material and form a first thickness of a structure comprises forming bonds between particles of the matrix material without forming bonds between the sacrificial material and the matrix material.

15. The method of claim 1, wherein introducing the feed material comprising a matrix material and a sacrificial material on the surface of a substrate comprises feeding the matrix material and the sacrificial material, the matrix material exhibiting a varying composition with a distance from the sacrificial material.

16. The method of claim 1, wherein removing the sacrificial material from the structure to form the at least one channel comprises forming the at least one channel to comprise a wall thickness that changes with a distance from an inlet of the at least one channel.

17. The method of claim 1, wherein removing the sacrificial material from the structure to form the at least one channel comprises forming the at least one channel with an increasing weight percent of a ceramic material with a distance from an inlet of the at least one channel.

18. The method of claim 1, wherein the matrix material comprises a first matrix material and a second matrix material, and wherein:
introducing the feed material and removing the sacrificial material from the structure to form the at least one channel comprises forming the at least one channel to be defined by the first matrix material defining outer walls of the at least one channel, and
introducing the feed material and removing the sacrificial material from the structure to form the at least one channel comprises forming the at least one channel such that the second matrix material surrounds the first matrix material.

19. A method of forming at east a component of a heat exchanger, the method comprising:
introducing a teed material comprising a matrix material and a sacrificial material on a surface of a substrate;
selectively exposing at least the matrix material to focused energy to form bonds between particles of the matrix material and form a first thickness of a structure;
introducing additional feed material comprising the matrix material over the first thickness of the structure;
selectively exposing the additional feed material to focused energy to form a second thickness of the structure; and
removing the sacrificial material from the structure to form at least one channel in the structure,
wherein introducing a feed material comprising a matrix material and a sacrificial material on a surface of a substrate and removing the sacrificial material from the structure to form at least one channel in the structure comprises forming the structure to comprise a greater concentration of a ceramic material proximate the at least one channel than distal from the at least one channel.

20. A method of forming at least a component of a heat exchanger, the method comprising:
   introducing a feed material comprising a matrix material and a sacrificial material on a surface of a substrate;
   selectively exposing at least the matrix material to focused energy to form bonds between particles of the matrix material and form a first thickness of a structure;
   introducing additional feed material comprising the matrix material over the first thickness of the structure;
   selectively exposing the additional feed material to focused energy to form a second thickness of the structure; and
   removing the sacrificial material from the structure to form at least one channel in the structure,
   wherein removing the sacrificial material from the structure to form at least one channel in the structure comprises forming the structure to exhibit a higher melting temperature proximate the at least one channel than at locations distal from the at least one channel.

* * * * *

UNITED STATES PATENT AND TRADEMARK OFFICE
CERTIFICATE OF CORRECTION

| | |
|---|---|
| PATENT NO. | : 11,845,132 B2 |
| APPLICATION NO. | : 17/806916 |
| DATED | : December 19, 2023 |
| INVENTOR(S) | : Isabella J. van Rooyen and Piyush Sabharwall |

It is certified that error appears in the above-identified patent and that said Letters Patent is hereby corrected as shown below:

In the Specification
Column 3, Line 14, change "the disclosure:" to --the disclosure;--

In the Claims
Claim 8, Column 17, Line 44, change "a teed material" to --a feed material--
Claim 11, Column 18, Line 1, change "polyetherimide (PEC)," to --polyetherimide (PEI),--
Claim 19, Column 18, Line 49, change "forming at east a" to --forming at least a--
Claim 19, Column 18, Line 51, change "a teed material" to --a feed material--

Signed and Sealed this
Thirteenth Day of February, 2024

Katherine Kelly Vidal
*Director of the United States Patent and Trademark Office*